Jan. 4, 1927. 1,612,925
M. K. INGOLDBY
HYDRAULIC PUMP AND MOTOR OF THE SWASH PLATE TYPE
Filed Sept. 21, 1925 2 Sheets-Sheet 1

Jan. 4, 1927. 1,612,925
M. K. INGOLDBY
HYDRAULIC PUMP AND MOTOR OF THE SWASH PLATE TYPE
Filed Sept. 21, 1925 2 Sheets-Sheet 2
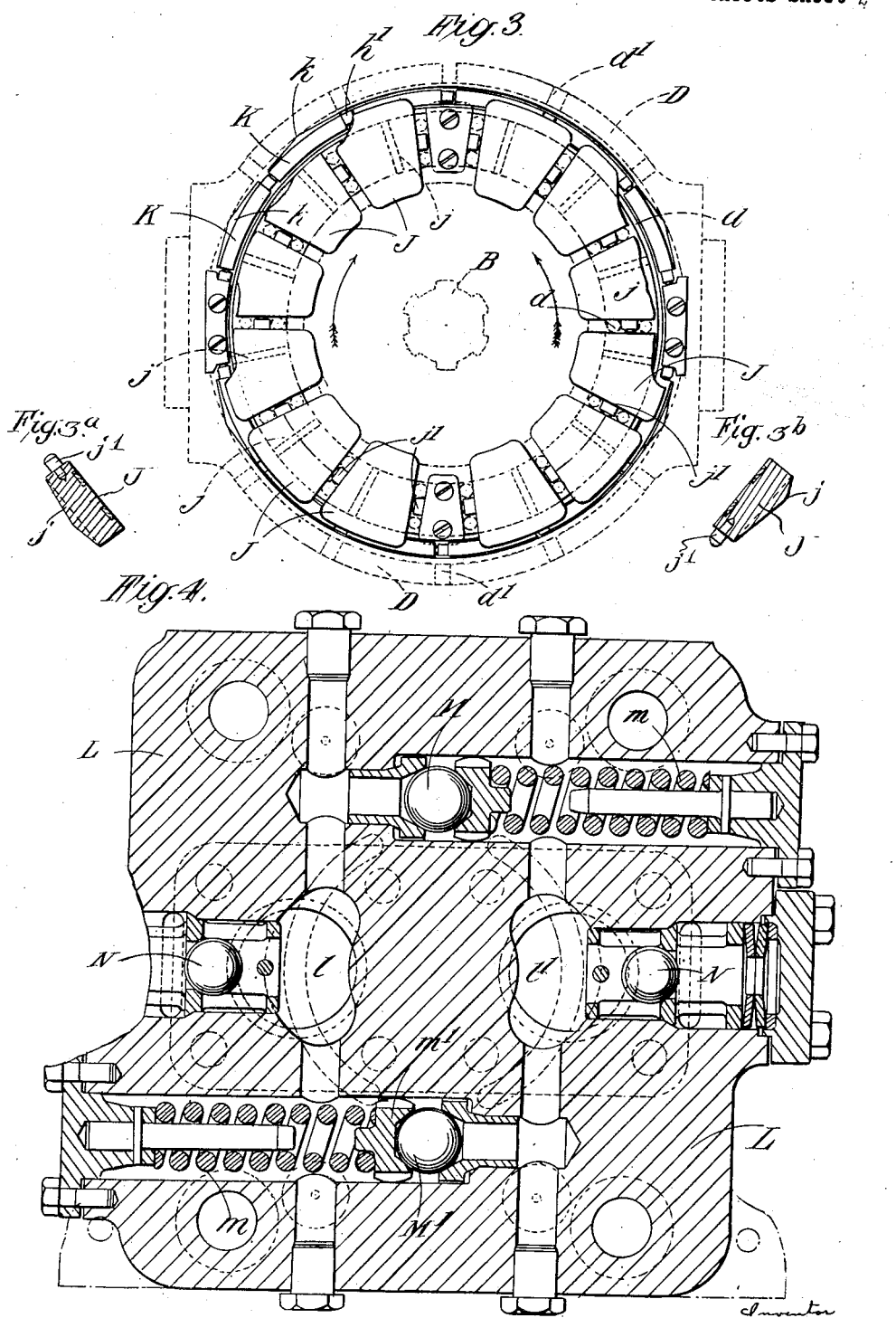

Patented Jan. 4, 1927.

1,612,925

UNITED STATES PATENT OFFICE.

MAURICE KERR INGOLDBY, OF WESTMINSTER, LONDON, ENGLAND, ASSIGNOR TO VICKERS LIMITED AND THE VARIABLE SPEED GEAR LIMITED, BOTH OF LONDON, ENGLAND, AND BOTH BRITISH COMPANIES.

HYDRAULIC PUMP AND MOTOR OF THE SWASH-PLATE TYPE.

Application filed September 21, 1925, Serial No. 57,560, and in Great Britain May 28, 1925.

This invention relates to hydraulic pumps and motors of the swash plate type, more particularly those adapted for use in the Williams-Janney type of hydraulic gear, and the chief object of the invention is to provide an improved bearing for the socket ring or swash plate of the tilting or angle box, by which the friction will be reduced and the pump or motor made capable of dealing with increased power. In such apparatus the bearings have hitherto been of ball or roller type and such bearings are expensive and unsuitable for continuous duty on account of the high speeds at which they are required to run.

In the improved apparatus the tilting or angle box receiving the socket ring or swash plate is provided with a series of separate bearing blocks or pads around its periphery and another series at the back to form respectively a journal bearing and a thrust bearing for the socket ring, and to provide for the proper lubrication of these bearing blocks the tilting box is provided with oil apertures leading from the outer case (which is as usual completely flooded with oil) into the interior of the tilting box and directing the oil immediately to the contact surfaces of the bearing blocks. The bearing blocks are of the well known Michell type and are preferably arranged for a slight rocking movement with an axis at the back which is out of centre with the bearing face. A further feature of the invention is the provision between the bearing pads themselves and the socket ring of a separating ring or rings providing the bearing surfaces for the pads.

The increased pressures which are made possible by the use of the Michell type of bearing require an improved means of relieving any fluid pressure in the pump or motor above a predetermined amount. For this purpose we propose to provide large relief valves in the valve plate of the apparatus which instead of relieving from either port into the case, as is usually done, are so arranged as to relieve pressure from one port to the other so that the volume of working fluid is not reduced and the fitting of the usual expensive additional relief valve is rendered unnecessary. To give increased strength to the swash plate and its support- ing members the joint bearing pins (in the case of a double universal joint apparatus) are extended behind the swash plate, which is provided with a rearward extension receiving the pins and forming a support or bearing for the extended pins.

In order that the said invention may be clearly understood and readily carried into effect, the same will now be described more fully with reference to the accompanying drawings, in which:—

Figure 3 is a face elevation of the swash plate illustrating more fully the arrangement of the bearing blocks or pads, sections of which are shown in the small detail views Figures 3ª and 3ᵇ; and Figure 4 is a sectional elevation of the relief valve arrangement.

The construction of the swash plate apparatus illustrated is of the known double universal joint type. A is the main case, B the main shaft, C the socket ring or swash plate mounted inside the tilting or angle box D. E is the cylinder barrel bored with the cylinders $e$ parallel to the barrel axis, in which reciprocate the pistons F provided with rods $f$ having ball terminations $f^1$, $f^2$, the balls $f^2$ fitting in spherical bearing recesses in the swash plate C. G, $G^1$ are the joint bearing or trunnion pins of the universal joint and in the construction illustrated the pins $G^1$ are of substantial length and are supported by the rearward extension $c$ of the swash plate or socket ring. H is the flanged ring (which may be in two separate parts) encircling the swash plate and forming bearing surfaces for the bearing blocks or pads J and K serving, respectively, for the thrust and the journal bearings of the swash plate C and adapted to rock about axes $j$ and $k$ against the inner faces of the angle box D. The general construction of the swash plate apparatus illustrated, and particularly the double universal joint arrangement, is known and the details of construction, except in so far as they relate to the present invention, are not described.

Figure 2:
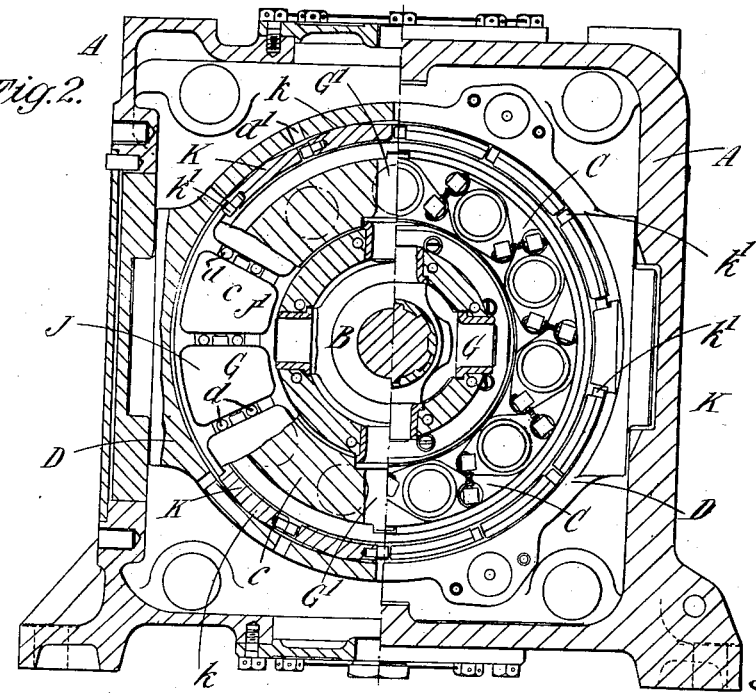
Figure 2 is a transverse section in two different planes showing the main features of construction of the apparatus, the left hand side of the figure being a half section through the trunnions and the right hand side a half section through the joint.

The flanged ring H, while made as one member in the manner shown, serves both for the thrust and journal bearings, providing a peripheral and a rear bearing surface, but obviously these may be provided by separate rings instead of a single flanged ring. The adjustment of the angle box is on well known lines and the stroke of the pistons which are arranged around the cylinder barrel E depends upon the angle to which the angle box and consequently the swash plate is set. The bearing blocks J and K are on the well known Michell lines and provide for a thin film of oil between the faces of the blocks and the opposed bearing surface. To provide for the thorough lubrication of the bearing surfaces the blocks are spaced apart by the small projections $j^1$, $k^1$ which may be formed at one side of each block at about the middle or may be placed at both sides so as to meet. Oil apertures $d$, $d^1$ are provided in the angle box D and are arranged so as to open at the gaps between the blocks as shown, particularly in Figures 2 and 3 of the drawings. Complete access of the oil to the bearing surfaces is consequently ensured, the case being as usual filled with oil through which the power is transmitted, the oil circulating in a closed cycle. The oil apertures $d$ are at the back of the angle box and the apertures $d^1$ in the flanged periphery, the apertures serving, respectively, for the thrust and the journal bearings. The arrangement of the flanged ring H, or the equivalent pair of rings, facilitates the replacement of any parts and if the bearing surfaces for the pads or block become worn a new bearing ring or rings can readily be inserted.

The Michell type of bearing shown comprises a number of blocks or pads which are off-set or pivotally mounted out of centre in order to obtain the lubrication effect required between the bearing surfaces. The off-setting of the rocking or pivotal axis $j$ of the thrust blocks depends upon the direction of the moving surface relatively to the surface of the block or pad J and consequently in reversible apparatus the advantages of the off-set cannot usually be obtained. In a tilted swash plate type of apparatus, however, the thrust bearing on one side of a neutral plane through the main or shaft axis and the axis of the tilted swash plate takes practically all the thrust for one direction of motion, while if the motion is reversed the thrust is taken by the bearing at the other side. As shown, therefore, in Figure 3 the bearing blocks or pads are arranged so as to be off-set in opposite directions at opposite sides of the neutral plane so that when the apparatus is rotating in one direction the off-setting of the pads is in the correct direction to give the proper efficiency of the bearing at the side taking the thrust, while when the motion is reversed the other half of the bearing blocks taking the thrust are then off-set in the correct direction. Thus as the centre of pressure for the two directions of motion differ and the thrust is practically confined to one half of the bearing blocks in the tilted swash plate type of apparatus the blocks receiving the main thrust always have the off-setting in the direction which is required for the direction of rotation when they are subjected to substantial pressure. The effect of incorrect off-setting, as generally understood, of the blocks or pads at the relatively thrust-free side is negligible.

The small detail sections Figures $3^a$ and $3^b$ show the relative positions of the blocks for opposite directions of rotation and it will be seen that the rocking axes $j$ of the blocks are oppositely spaced with regard to the ends of the blocks for opposite sides of the neutral vertical central plane.

With the provision of bearing blocks of the kind illustrated the apparatus is adapted to take a considerably greater thrust than similar apparatus provided with ball or roller bearings and to provide for this additional thrust the method of supporting the joint bearing pins $G^1$ is especially designed. The rearward extension $c$ of the swash plate or socket ring provides for a greatly increased length of support or bearing for the joint bearing pins $G^1$ and this increased length considerably increases the strength of the apparatus and enables the swash plate to take greater stresses without injury. This method of mounting the pins is necessarily associated with a double universal joint type of apparatus as shown, as the pin axes must be out of line with the spherical ends $f^2$ of the connecting rods $f$, while with a single universal joint apparatus of the well known type the bearing pin axes must be in line with the spherical ends $f^2$ and increased surface of bearing or support for the pins $G^1$ would not be feasible.

Figure 1:
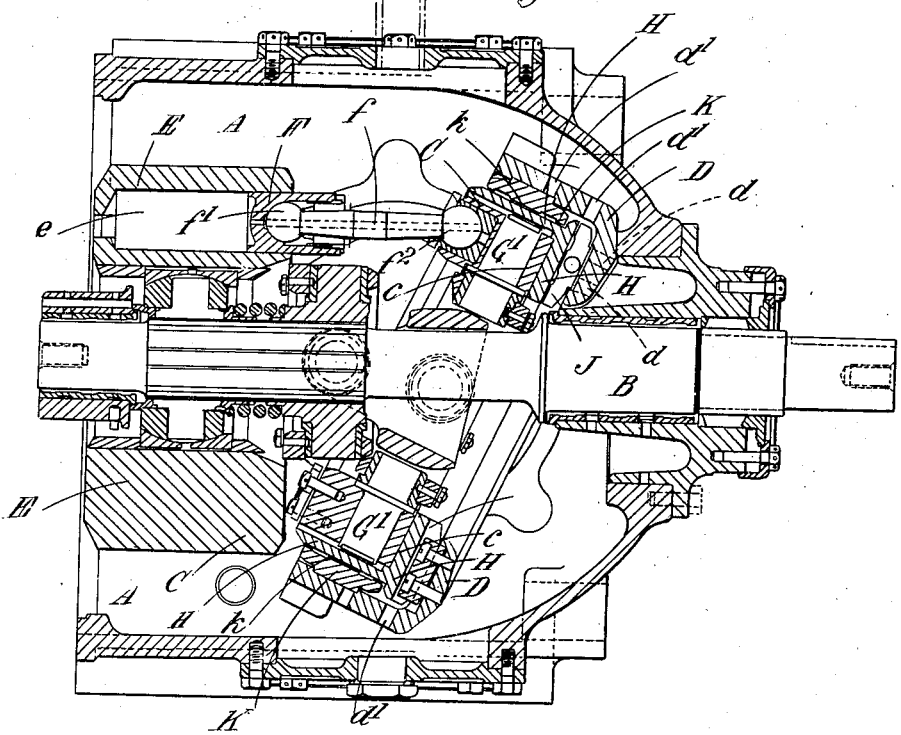
Figure 1 is a longitudinal section through apparatus of the swash plate type embodying the present invention.

The increased pressures which are made possible by the improved construction require an improved means of relieving any fluid pressure in the pump or motor above a predetermined amount, as already explained, and Figure 4 illustrates a relief valve arrangement especially designed for this construction of apparatus. L is the valve plate which lies behind the cylinder barrel and is not shown in Figure 1, but would be fitted at the left hand side of the apparatus shown in that figure. The valve plate is provided with the relief ports $l$, $l^1$ and the valves M, $M^1$ instead of, as has hitherto been the case, relieving the pressure from either port $l$, $l^1$ into the case A, are arranged to relieve pressure from one port to the other so as to avoid any disturbance in the volume of the working fluid and render the usual expensive additional relief valve unnecessary.

The valves M, M¹ afford relief in opposite directions, the valve M allowing of escape of the oil from the port $l$ to the port $l^1$ while the valve M¹ allows of the reverse relief. N, N are replenishing valves for supplying oil to the apparatus as required. The valves M, M¹ shown are of ball type with springs $m$ and caps $m^1$ pressing the balls against their seats.

What I claim and desire to secure by Letters Patent of the United States is:—

1. In hydraulic apparatus of the swash plate type, a tilting or angle box receiving the swash plate, a series of separate bearing blocks around the periphery of the swash plate and a second series of bearing blocks at the back of the said swash plate, which blocks form respectively a journal bearing and a thrust bearing for the swash plate within the angle box and oil apertures in the angle box admitting oil for lubrication to the bearing surfaces.

2. In hydraulic apparatus of the swash plate type, an angle box receiving the swash plate, a series of separate bearing blocks around the periphery of the swash plate and a second series of bearing blocks at the back of the said swash plate, which blocks form respectively a journal bearing and a thrust bearing for the swash plate within the angle box, and oil apertures in the angle box, both at the rear and in the periphery, admitting oil directly to the bearing surfaces, the said bearing blocks being spaced apart to allow the oil to reach the bearing surfaces readily.

3. In hydraulic apparatus as in claim 1, a separating ring between the said bearing blocks and the swash plate, adapted to form a bearing surface for the bearing blocks.

4. In hydraulic apparatus as in claim 1, a separating bearing ring between the swash plate and the thrust bearing blocks and a separating bearing ring between the said swash plate and the journal bearing blocks.

5. In hydraulic apparatus as in claim 1, projecting members on the sides of the said bearing blocks whereby the bearing blocks are spaced from one another, the lubricating oil being admitted into the spaces.

6. In reversible apparatus of swash plate type, an angle box receiving the swash plate, a series of separate thrust bearing blocks at the back of the said swash plate, which bearing blocks are arranged to rock about axes off-set or out of centre, and the said blocks are arranged in two groups, one on each side of the neutral central plane through the axis at right angles to the plane of the swash plate, the bearing blocks on one side of the said neutral plane being off-set in the opposite direction to the blocks on the other side whereby the off-setting of the blocks is in the correct direction at the side of the neutral plane receiving the thrust for either direction of drive.

7. In hydraulic apparatus of the kind set forth, a rotatable swash plate, a power transmitting double universal joint connected to said swash plate, piston rods, means for connecting said piston rods to said swash plate, transverse bearing pins on the end of the joint connected to the swash plate and a rearward extension of the swash plate through which the said bearing pins extend behind the connections of the piston rods belonging to the said swash plate.

8. In hydraulic apparatus as in claim 1, a rotating power shaft, a double universal joint between the said shaft and the swash plate, transverse bearing pins mounted upon the member of the universal joint connected to the swash plate and a rearward extension of the swash plate formed with apertures through which the said transverse bearing pins extend.

MAURICE KERR INGOLDBY.